United States Patent [19]

Ichikawa

[11] Patent Number: 5,729,555
[45] Date of Patent: Mar. 17, 1998

[54] METHOD AND APPARATUS FOR TESTING OUTPUT DEVICE

[75] Inventor: Hiroyasu Ichikawa, Yokohama, Japan

[73] Assignee: Fujitsu Limited, Kawasaki, Japan

[21] Appl. No.: 854,478

[22] Filed: May 12, 1997

Related U.S. Application Data

[63] Continuation of Ser. No. 274,690, Jul. 14, 1994, abandoned.

[30] Foreign Application Priority Data

Oct. 7, 1993 [JP] Japan ................................. 5-251804

[51] Int. Cl.$^6$ ................................................. G01R 31/28
[52] U.S. Cl. ................ 371/27; 371/27.2; 364/717
[58] Field of Search ........................... 371/27.1, 27.2; 364/717, 717.5, 718, 716, 579, 581

[56] References Cited

U.S. PATENT DOCUMENTS

| | | | |
|---|---|---|---|
| 4,580,242 | 4/1986 | Suzuki et al. | 364/900 |
| 4,870,397 | 9/1989 | Soto et al. | 340/747 |
| 5,202,978 | 4/1993 | Nozuyama | 395/575 |
| 5,281,910 | 1/1994 | Emmoto et al. | 324/158 R |
| 5,297,151 | 3/1994 | Gruetzner et al. | 371/27 |
| 5,357,523 | 10/1994 | Bogholtz et al. | 371/27 |
| 5,359,546 | 10/1994 | Hayes et al. | 364/579 |
| 5,432,797 | 7/1995 | Takano | 371/27 |

*Primary Examiner*—Hoa T. Nguyen
*Assistant Examiner*—Nadeem Iqbal
*Attorney, Agent, or Firm*—Staas & Halsey

[57] ABSTRACT

Disclosed are a method and apparatus suitable for testing an output device, particularly, a laser printer. Definitions of control orders for specifying paper size, etc., graphics orders for specifying the graphics and characters to be printed, and attribute orders for specifying the attributes of the graphics and characters to be printed, are stored in advance along with their frequencies of occurrence. By generating random numbers, orders are selected sequentially from among the thus defined orders with probabilities proportional to the frequencies of occurrence, thereby automatically generating a test pattern which is stored in memory. When testing, the paper size is entered, and coordinates, contained in the test pattern, made to match the standard size are transformed to match the specified paper size and are then supplied to the device under test.

8 Claims, 8 Drawing Sheets

Fig. 4

| 1 | PAPER SIZE ORDER | 00FF | |
|---|---|---|---|
| 2 | CLEAR ORDER | | |
| 3 | CLIP ORDER | 7FFF | 7FFF |
| 4 | PAPER EJECT ORDER | 001F | |
| 5 | DATA TRANSFER ORDER | FFFF | |
| 6 | END CODE | | |

Fig. 5

|   | OCCURRENCE FREQUENCY SPECIFYING VALUE |
|---|---|
| 1 | 655 |
| 2 | 1966 |
| 3 | 1966 |
| 4 | 1966 |
| 5 | 58982 |

Fig. 6

|   | RANDOM NUMBER RANGE | FREQUENCY OF OCCURRENCE |
|---|---|---|
| 1 | 0 ~ 654 | 655/65535 = 1% |
| 2 | 655 ~ 2620 | 1966/65535 = 3% |
| 3 | 2621 ~ 4586 | 1966/65535 = 3% |
| 4 | 4587 ~ 6552 | 1966/65535 = 3% |
| 5 | 6553 ~ 65535 | 58982/65535 = 90% |

Fig.7

| 1 | LINE ATTRIBUTE A | 000F | |
|---|---|---|---|
| 2 | LINE ATTRIBUTE B | 00FF | |
| 3 | CHARACTER ATTRIBUTE A | 00FF | |
| 4 | CHARACTER ATTRIBUTE B | 00FF | |
| 5 | CHARACTER ATTRIBUTE C | 000F | |
| 6 | CHARACTER ATTRIBUTE D | 0007 | |
| 7 | IMAGE ATTRIBUTE | 0001 | 0007 |
| 8 | END CODE | | |

Fig.8

| | OCCURRENCE FREQUENCY SPECIFYING VALUE |
|---|---|
| 1 | 10922 |
| 2 | 10922 |
| 3 | 10922 |
| 4 | 10922 |
| 5 | 10922 |
| 6 | 10922 |
| 7 | 0 |

Fig.9

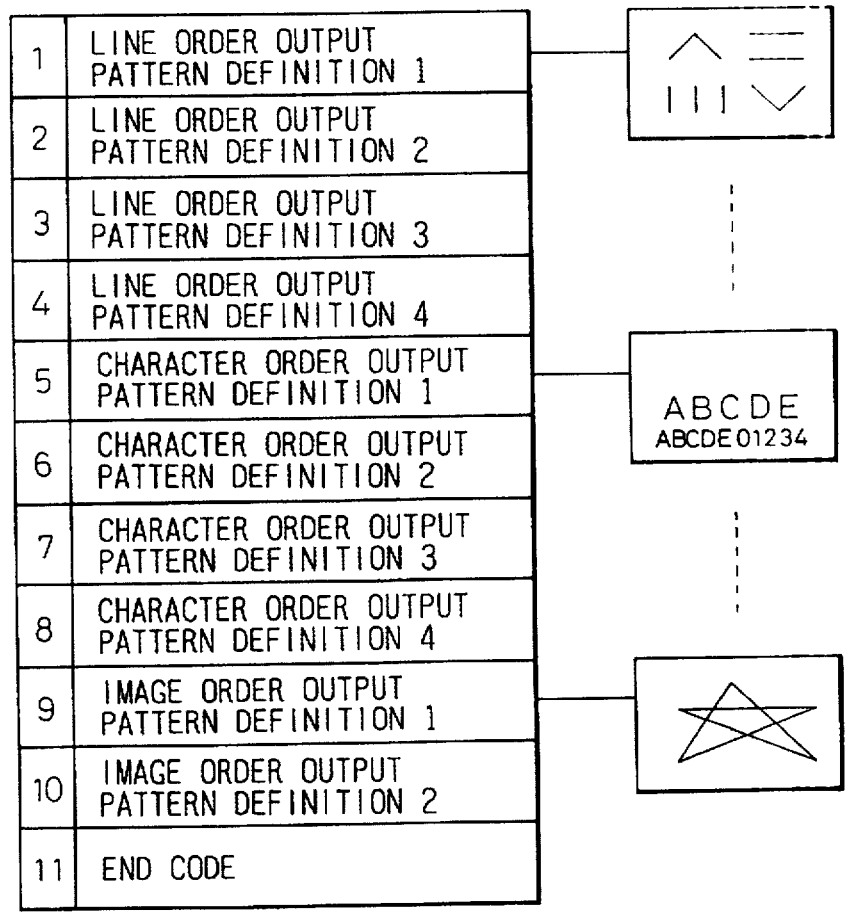

| | |
|---|---|
| 1 | LINE ORDER OUTPUT PATTERN DEFINITION 1 |
| 2 | LINE ORDER OUTPUT PATTERN DEFINITION 2 |
| 3 | LINE ORDER OUTPUT PATTERN DEFINITION 3 |
| 4 | LINE ORDER OUTPUT PATTERN DEFINITION 4 |
| 5 | CHARACTER ORDER OUTPUT PATTERN DEFINITION 1 |
| 6 | CHARACTER ORDER OUTPUT PATTERN DEFINITION 2 |
| 7 | CHARACTER ORDER OUTPUT PATTERN DEFINITION 3 |
| 8 | CHARACTER ORDER OUTPUT PATTERN DEFINITION 4 |
| 9 | IMAGE ORDER OUTPUT PATTERN DEFINITION 1 |
| 10 | IMAGE ORDER OUTPUT PATTERN DEFINITION 2 |
| 11 | END CODE |

Fig.10

| | OCCURRENCE FREQUENCY SPECIFYING VALUE |
|---|---|
| 1 | 8192 |
| 2 | 8192 |
| 3 | 8192 |
| 4 | 8192 |
| 5 | 8192 |
| 6 | 8192 |
| 7 | 8192 |
| 8 | 8192 |
| 9 | 0 |
| 10 | 0 |

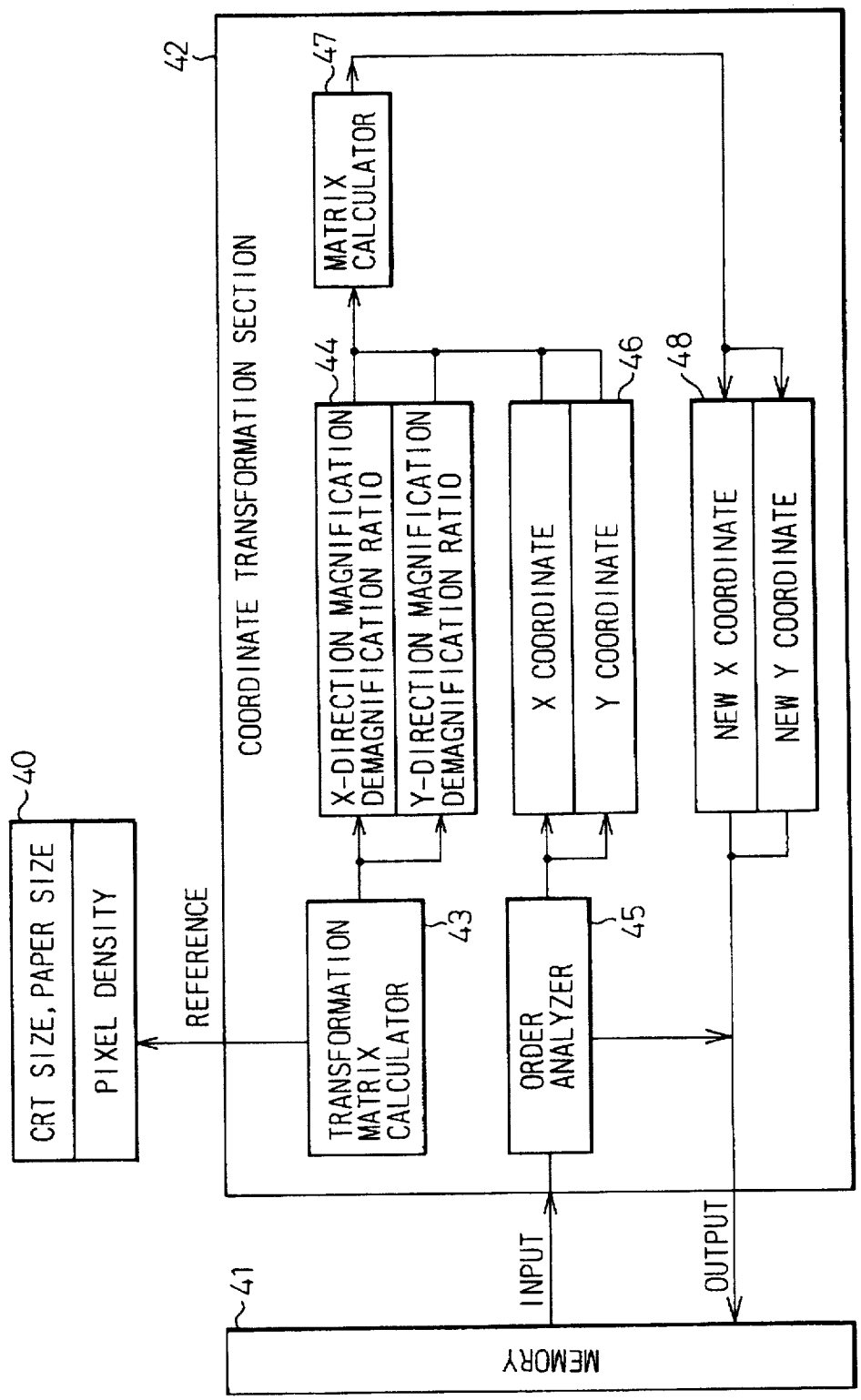

METHOD AND APPARATUS FOR TESTING OUTPUT DEVICE

This application is a continuation of application Ser. No. 08/274,690, filed Jul. 14, 1994, now abandoned.

BACKGROUND OF THE INVENTION

1. Field of the Invention

The present invention relates to a method and apparatus for testing an output device such as a display, printer, or the like.

2. Description of the Related Art

When performing design verification, in-process testing, maintenance testing, etc. on an output device such as a display, printer, or the like, a prescribed test pattern is applied to the device under test (the output device) using a test program, and the output from that device is checked to determine whether the device functions properly. Such a test pattern is composed of a sequence of orders. In the case of a laser beam printer, for example, the orders include: control orders for specifying control items such as paper size specification, print data transfer, and printed paper ejection; graphics orders for specifying the graphics and characters to be printed; and attribute orders for specifying the attributes, such as line width, of the graphics and characters to be printed.

A test pattern produced by combining these kinds of orders is supplied to the output device to test the various functions that the output device is supposed to perform.

More specifically, in testing an output device, the output device (the device under test) is connected to test equipment, and a test program that runs on the test equipment is executed to operate the output device under test.

The test equipment operating in accordance with the test program outputs a test pattern composed of a sequence of orders created for testing purposes, in response to which the output device under test produces graphics, characters, etc. on a CRT screen (when the output device is a CRT) or on paper (when the output device is a printer).

Then, the test operator visually examines the test result and determines whether the device under test is functioning properly. Besides performing the visual examination, since the device under test returns its status to the test equipment in response to the orders, the returned status is compared with the normal status value to check for the correct functioning of the device under test.

As described earlier, the test pattern is a sequence of orders created in various combinations of control orders, graphics orders, and attribute orders. In previous methods, test program developers had to create appropriate test pattern according to the purpose of the test.

However, since test patterns have to be created in various combinations of orders, i.e., combinations of control orders alone, combinations of graphics orders and attribute orders, and combinations of control orders, graphics orders, and attribute orders, there are an unlimited number of possible combinations. In particular, with recent printers, the number of attributes such as the kind, size, etc. of printable characters has been increasing, necessitating increased number of patterns.

Thus, for test program developers, creating test patterns has been time-consuming work, presenting a problem in terms of productivity. Another problem is that much of the work depends on the experience and intuition of each individual developer, the difference in experience of the developer being directly reflected in the result.

A further problem is that since there are too many combinations for the test program developer to consider, there is a possibility that some of the necessary test items may be omitted.

Furthermore, then creating such test patterns, the coordinates of graphics data have to be specified by considering the size of the output medium (CRT screen or printer paper) onto which the device under test produces an output; this has necessitated preparing different test patterns for different output media.

SUMMARY OF THE INVENTION

It is an object of the present invention to provide a method and an apparatus, for testing an output device, which overcome the above-enumerated problems and which are capable of simplifying the procedures for creating test pattern, easing the burden of programmers, and yet providing sufficient numbers of test pattern combinations.

According to the present invention, there is provided a method of testing an output device, comprising the steps of: a) generating a random sequence; b) selecting one order from among a plurality of orders in accordance with the thus generated random sequence; c) generating a test pattern containing a plurality of orders generated by repeating the steps a) and b); and d) storing the thus generated test pattern.

According to the present invention, there is also provided an apparatus for testing an output device, comprising: means for generating a random sequence; means for selecting one order from among a plurality of orders in accordance with the random sequence generated by the random sequence generating means; means for generating a test pattern containing a plurality of orders generated by enabling the random sequence means and the selecting means alternately; and means for storing the test pattern generated by the generating means.

BRIEF DESCRIPTION OF THE DRAWINGS

FIG. 4 is a diagram showing an example of a control order type definition table;

FIG. 5 is a diagram showing an example of a control order occurrence frequency table;

FIG. 6 is a diagram showing random sequence ranges calculated from occurrence frequency specifying values, and occurrence frequencies expressed in percentage terms;

FIG. 7 is a diagram showing an example of an attribute order type definition table;

FIG. 8 is a diagram showing an example of an attribute order occurrence frequency table;

FIG. 9 is a diagram showing an example of a graphics order definition table;

FIG. 10 is a diagram showing an example of a graphics order definition occurrence frequency table;

FIG. 12 is a diagram showing a configuration for coordinate transformation.

DESCRIPTION OF THE PREFERRED EMBODIMENTS

Figure 1:
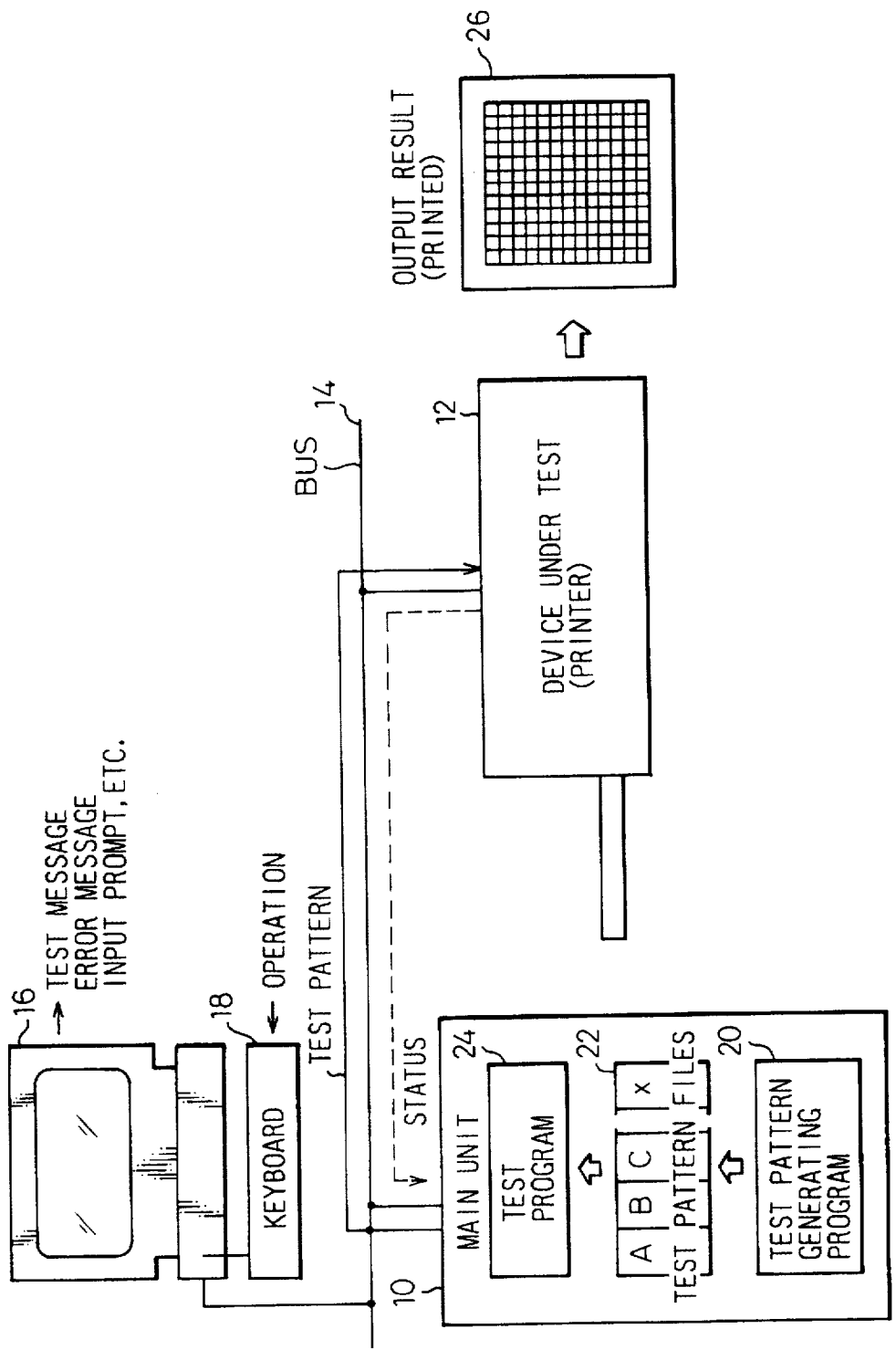
FIG. 1 is a block diagram showing one embodiment of the present invention.

FIG. 1 shows an example of a test method according to one embodiment of the present invention. A main unit 10 and a device under test 12, in this example a laser printer, are interconnected by a data transfer bus 14. Also connected to the bus 14 is a console 16 which displays test messages, error messages, and input prompts. A keyboard 18 for entering data in response to the prompt is connected to the console 16. A personal computer or workstation of known configuration, containing a CPU, main memory, and external storage (not shown), may be used as the main unit 10.

To generate test patterns used for testing the device 12, a test pattern generating program 20 is loaded into the main unit 10. By running the test pattern generating program 20, a large number of test pattern files 22 are generated. Since the device 12 need not be connected when generating test patterns, the test pattern generating program 20 may be run on another personal computer or workstation, and the test patterns 22 thus generated may be transferred to the main unit 10.

To test the laser printer 12 using the test patterns 22, a test program 24 is loaded into the main unit 10. By running the test program 24 on the main unit 10, the test patterns 22 are sequentially transferred in DMA mode to the laser printer 12 via the bus 14. The test operator visually examines the print result 26 that is output from the laser printer 12 in response to the test pattern input, and checks the correct functioning of the laser printer 12. Besides outputting the result, the laser beam printer 12 returns a status value to the main unit 10 where the value is compared with the status value expected to be returned in normal operation. If a fault condition is detected, an error message is displayed on the console 16.

Figure 2:
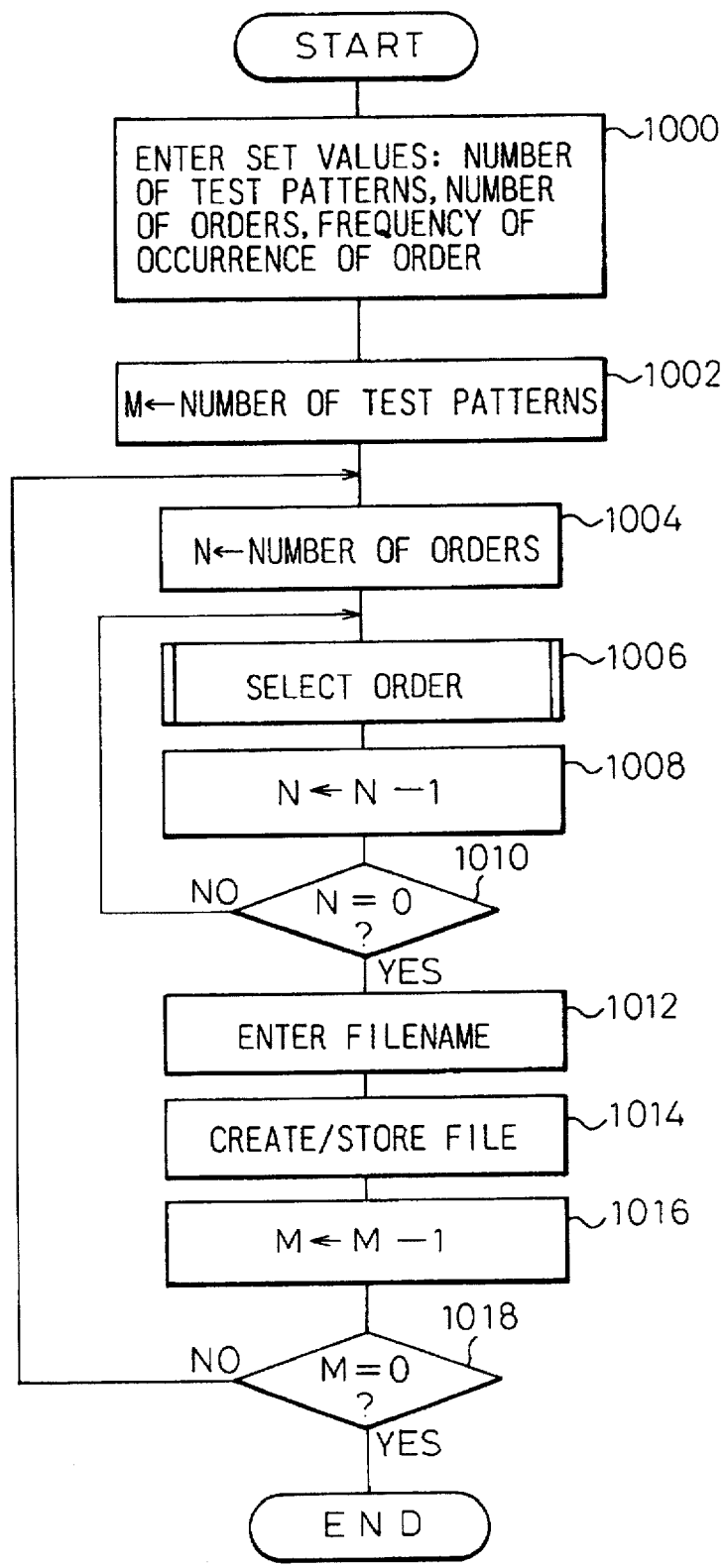
FIG. 2 is a flowchart illustrating a sequence of operations for test pattern generation.

FIG. 2 is a flowchart outlining the operation of the main unit 10 when the test pattern generating program 20 is being run on the main unit 10. In step 1000, the test operator is prompted to enter a set of values which include the number of test pattern files to be generated, the number of orders to be contained in each test pattern, and the frequency with which to generate each order. When the test operator has entered these values, the operation proceeds to the next step. In step 1002, the entered number of test patterns is substituted for a variable M, and in step 1004, the entered number of orders is substituted for a variable N. In step 1006, one order is automatically selected. The order selection process will be described in detail later. In step 1008, the value of the variable N is decremented, and the steps 1006 to 1008 are repeated until variable N becomes equal to zero. With this sequence of operations, a sequence of orders to be contained in one test pattern are determined. In the next step 1012, the test operator is prompted to enter a filename to be assigned to the determined test pattern. When the filename is entered, a file with the assigned filename is created and the test pattern is stored in that file (step 1014). As an alternative, it may be so configured as to generate a test pattern filename automatically. When one test pattern file has been created, the value of the variable M is decremented (step 1016), and the processing of steps 1004 to 1016 is repeated until the value of variable M becomes equal to zero. In the example shown in FIG. 2, each test pattern is stored with a separate filename, but as an alternative, a plurality of test patterns may be stored into the same file, which may be more desirable.

Figure 3:
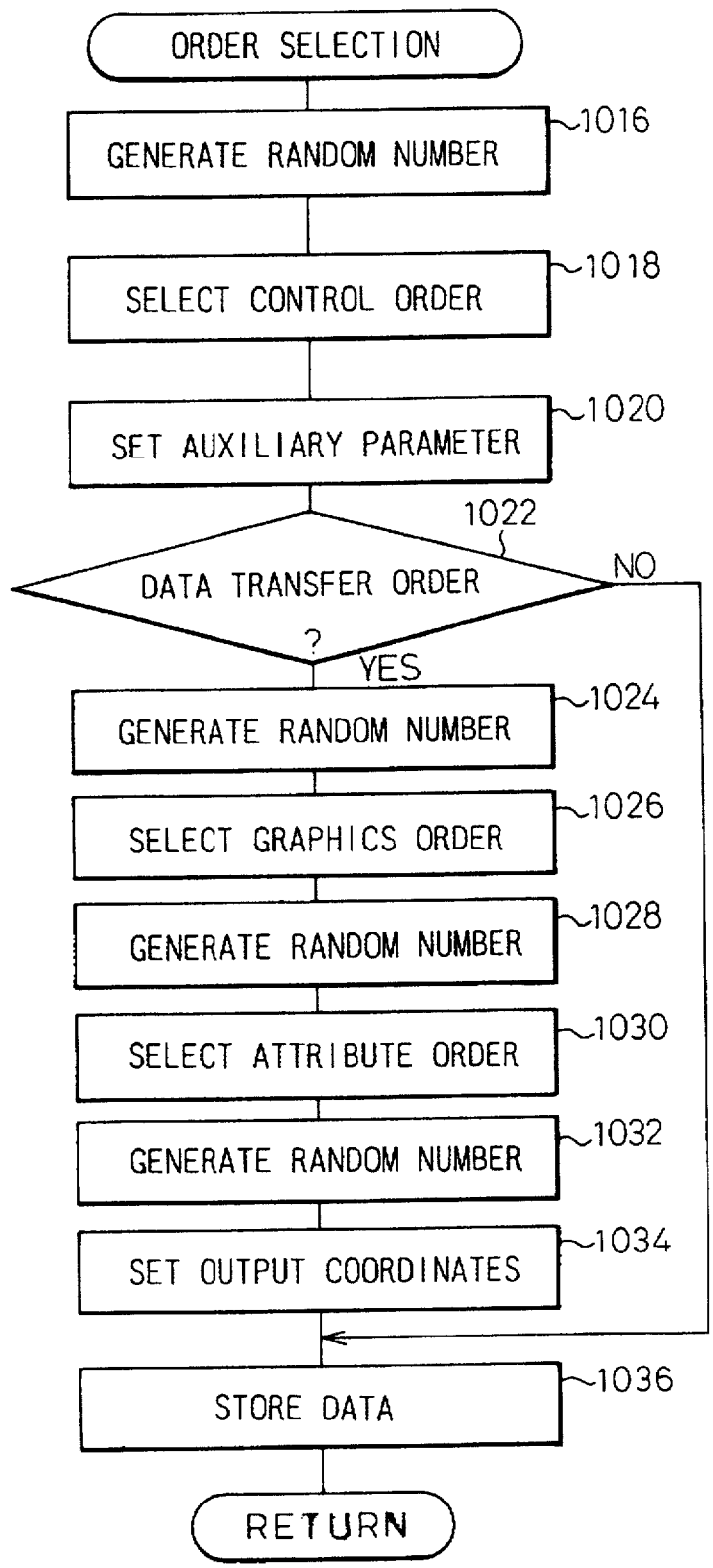
FIG. 3 is a flowchart illustrating the detail of an order selection process in FIG. 2.

FIG. 3 is a flowchart illustrating the detail of the order selection process in step 1006 in FIG. 2. In step 1016, a random number is generated, and in step 1018, one control order is selected by referencing an occurrence frequency table (to be described later) in accordance with the thus generated random number. The random number may be generated using a known pseudo-random number generating algorithm. By referencing a control order type definition table (to be described later) in accordance with the selected control order, the necessary auxiliary parameter (to be described later) is set (step 1020). When the selected control order is a data transfer order, the process proceeds to steps 1024 to 1034, where the data to be transferred, i.e., a graphics order, an attribute order, and the coordinates of the graphics and characters to be output, are determined. The identifiers and auxiliary parameters of the thus determined orders are stored in memory (step 1036).

FIG. 4 shows an example of a control order type definition table that is prestored and used to define the control orders contained in test patterns and their types. In the example shown in FIG. 4, a "paper size order" for specifying paper size, a "clear order" for clearing print buffer, a "clip order" for specifying an area to be clipped in the print buffer, a "paper eject order" for printing the contents of the print buffer onto paper and ejecting the paper, and a "data transfer order" for transferring data to the print buffer, are defined. Since the table is of a variable-length type, the end of the table is marked by an end code. As shown in FIG. 4, the control order type definition table defines the type of each control order. For example, "00FF" is given to the paper size order in the first row. This indicates that the paper size order consists of its identifier followed by an auxiliary parameter for specifying paper size, the variable range thereof being 0000 to 00FF.

FIG. 5 is a diagram showing an example of a control order occurrence frequency table which stores the occurrence frequencies of control orders entered in step 1000 by the test operator. The numbers in the left column correspond to the numbers in the left column in the table of FIG. 4. In the example shown in FIGS. 4 and 5, the frequency of occurrence of the paper size order is specified as "655", the frequency of occurrence of each of the clear order, clip order, and paper eject order is specified as "1966", and the frequency of occurrence of the data transfer order is specified as "58982".

FIG. 6 is a diagram showing the random number ranges to be calculated from the occurrence frequency specifying values, and the occurrence frequencies expressed in percentage terms. For example, when the value of the random number (16 bits: $2^{16}=65536$) generated in step 1016 in FIG. 3 falls within the range of 0 to 655−1, then the paper size order in the first row is selected; when it is within the range of 655 to 655+1966−1 (2620), the clear order in the second row is selected; and when it is within the range of 2621 to 2621+1966−1 (4586), the clip order in the third row is selected. The occurrence frequencies of the control orders in percentage terms are 1%, 3%, 3%, 3%, and 90%, respectively. The test operator must enter the occurrence frequency values so that their sum is $2^{16}=65536$. Alternatively, it may be so arranged that when the total of the entered occurrence frequencies does not amount to 65536, the values are automatically adjusted so that their sum becomes equal to the above total value while maintaining their prescribed ratios.

When a control order, whose auxiliary parameter is defined in the control order type definition table of FIG. 4, is selected in step 1018 in FIG. 3, the auxiliary parameter is determined in the next step 1020. To determine the auxiliary parameter, a 16-bit random number is generated and is ANDed with the numeric value given in the control order type definition table. However, the auxiliary parameter assigned to the data transfer order in the fifth row will not be determined using a random number, since it is a pointer that points to the beginning of a storage area for the graphics order, attribute order, and output coordinates.

FIG. 7 shows an example of an attribute order type definition table that is prestored and used to define the attribute orders and their types. As in the case of the control order type definition table of FIG. 4, each row of the table stores the identifier of an attribute order and the data designating a variable range for the auxiliary parameter that comes next after the identifier. For example, if "line attribute A" in the first row is an attribute order for specifying line width, 16 different line widths can be specified using the parameter placed after it.

FIG. 8 shows an example of an attribute order occurrence frequency table for storing the occurrence frequencies of the attribute orders entered by the test operator in step 1000 in FIG. 2. As in the control order occurrence frequency table, the respective rows in the attribute order occurrence frequency table of FIG. 8 are related to the corresponding rows in the attribute order type definition table of FIG. 7 by the numbers in the left column.

As in the case of the control orders, in the example shown in FIG. 8, when the value of the random number generated in step 1028 in FIG. 3 falls within the range of 0 to 10921, "line attribute A" is selected as the attribute order in step 1030, and when it is within the range of 10922 to 21843, "line attribute B" is selected. For the attribute orders in the first to sixth rows, an occurrence frequency of equal value is specified, while "0" is specified for the attribute order in the seventh row. This means that each of the attribute orders in the first to sixth rows is selected with equal probability, while the probability of selecting the attribute order in the seventh row is zero.

When an attribute order, whose auxiliary parameter is defined in the attribute order type definition table of FIG. 7, is selected, a random number is generated, and the random number thus generated is ANDed with the numeric value given in the table, to determine the value of the auxiliary parameter.

FIG. 9 shows an example of a graphics order definition table that is prestored and used to define the graphics orders. Unlike the control orders or attribute orders which are selected, one at a time, using a random number, the graphics orders are grouped under a plurality of output pattern definitions each consisting of several graphics orders, and one output pattern definition is selected from among them using a random number. For example, "line order output pattern definition 1" in the first row consists of seven line orders, as shown at the right of FIG. 9. These line orders are given in relative coordinates, and the coordinates of the reference point are determined in steps 1032 and 1034 in FIG. 3.

FIG. 10 shows an example of a graphics order definition occurrence frequency table for storing the occurrence frequencies of the graphics order definitions entered in step 1000 in FIG. 2. In the illustrated example, each of the graphics order definitions (output pattern definitions) in the first to eighth rows is selected with equal probability, while the probability of selecting the graphics order definition in the ninth row or tenth row is zero. An arrangement can be made to eliminate a certain order from selection by setting its frequency of occurrence to zero. For example, if it is arranged so that for the attribute orders, only the orders relating to lines (the attribute orders in the first and second rows in the example of FIG. 7) can be selected, and for the graphics data definitions, only the graphics order definitions consisting only of line orders (the output pattern definitions in the first to fourth rows in the example of FIG. 9) can be selected, then improper combinations between the attribute orders and graphics order definitions can be prevented. On the other hand, test patterns containing improper combinations can be generated deliberately, to check whether the device under test responds correctly to such a test patterns.

Figure 11:
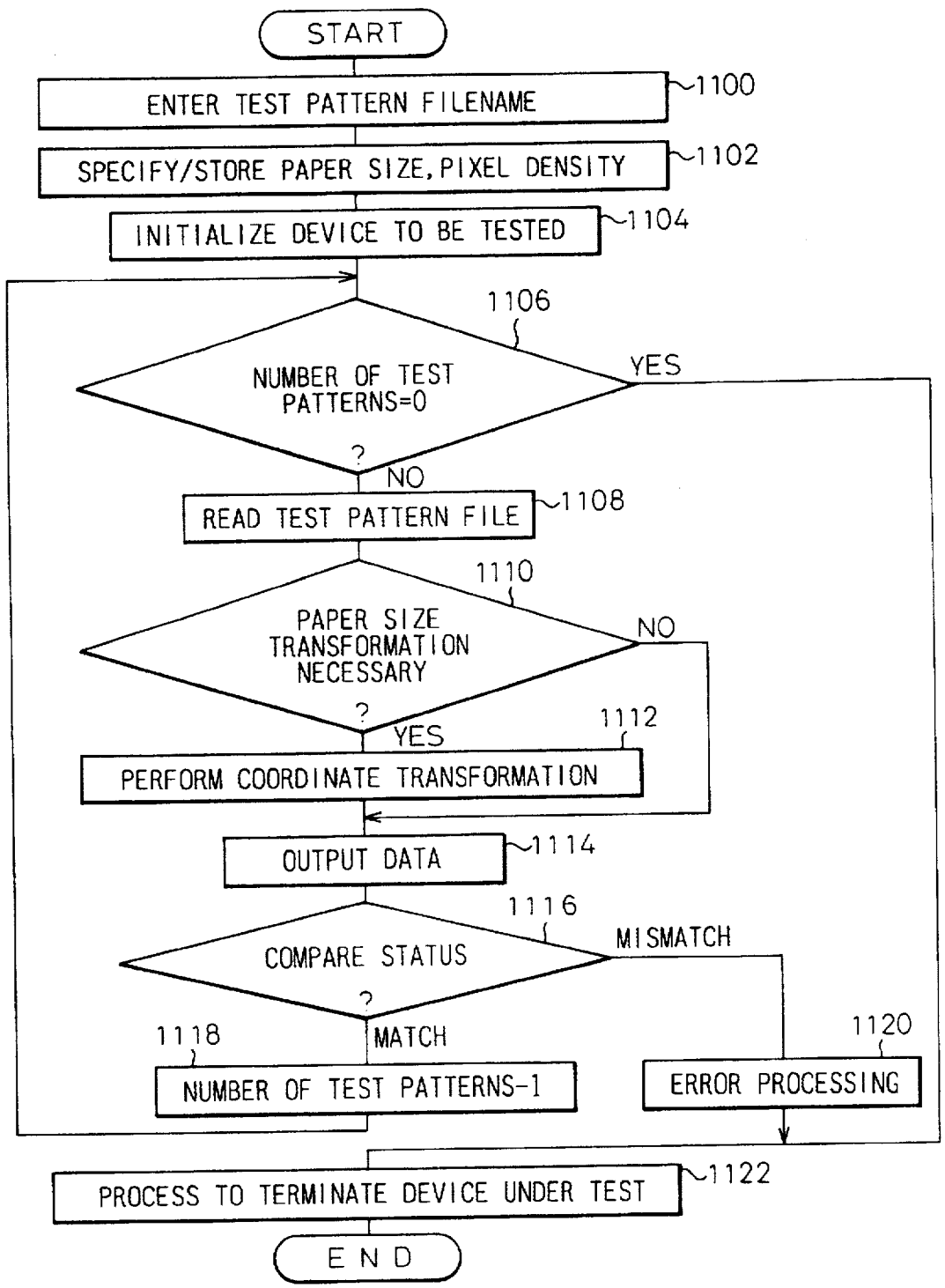
FIG. 11 is a flowchart illustrating a sequence of operations in carrying out testing.

FIG. 11 is a flowchart illustrating the operation of the main unit 10 when the test program 24 (FIG. 1) is being run on the main unit 10. FIG. 11 specifically shows the operation in the case where a plurality of test patterns are stored in a single test pattern file, but the operation is basically the same for the case where each test pattern is stored in a separate file.

First, a test pattern program name is entered from the keyboard 10 (step 1100). Next, when output conditions such as paper size, pixel density, etc. are entered from the keyboard 10, these conditions are stored in an output condition storage area in the main unit 10 (step 1102). Next, the device under test 12 is initialized and made ready for use (step 1104). Thereafter, the number of remaining test patterns is checked (step 1106); if there is any remaining test pattern, the test pattern is read into the memory (from the external storage) (step 1108). Next, it is checked whether paper size transformation is necessary (step 1110). In this step, it is checked whether the paper size specified in step 1102 is the standard size (A4) set when generating the test pattern. If it is the standard size, the process proceeds to step 1114; otherwise, the coordinate values contained in the test pattern are transformed to match the specified paper size, thereby performing magnification or reduction (step 1112). Coordinate transformation will be described below.

In the present invention, a test pattern file 22 is created using the test pattern generating program 20. The test pattern file generated according to the invention is composed of orders such as control orders, attribute orders, and graphics orders; of these orders, the graphics orders are defined with coordinate values specified according to the standard paper size (or screen size). The test program 24 performs testing by outputting the test pattern file to the device under test, but there may be cases where the test cannot be conducted, depending on the paper size (screen size), pixel density, etc. In such cases, coordinate transformation becomes necessary to match the output paper size (screen size).

FIG. 12 is a diagram showing a configuration for coordinate transformation. In FIG. 12, 40 is the output condition storage area where the output conditions specified in step 1102 are stored, 41 is the memory into which the test pattern in step 1108 has been read, and 42 is a coordinate transformation section.

In the coordinate transformation section 42, a transformation matrix calculator 43 references (reads) the paper size and pixel density stored in the output condition storage area 40, calculates an X-direction magnification ratio (denoted as $S^X$) and a Y-direction magnification ratio (denoted as $S^Y$), and stores them in a storage section 44. The following equations are used for the calculations, where DPI is the number of pixels per inch, generally expressed as dots/inch.

$$S^X = \frac{\text{Paper size in } X \text{ direction (in inches)} \times \text{Pixel density } (DPI)}{\text{Pixel count in } X \text{ direction on standard paper (screen)}} \quad (1)$$

$$S^Y = \frac{\text{Paper size in } Y \text{ direction (in inches)} \times \text{Pixel density } (DPI)}{\text{Pixel count in } Y \text{ direction on standard paper (screen)}} \quad (2)$$

Next, the sequence of orders loaded from the test pattern file is read from the memory 41 and supplied to an order analyzer 45. The order analyzer 45 analyzes the sequence of orders, extracts X-coordinate and Y-coordinate data, and stores the respective coordinate data into a storage section 46. Data other than the X-coordinate and Y-coordinate data are output directly to the memory 41. The X-coordinate and Y-coordinate data extracted for transformation are then supplied to a matrix calculator 47 where coordinate transformation is performed using matrix calculation in accordance with the X-direction and Y-direction magnification/demagnification ratios. The coordinates after transformation (denoted as X' coordinate, Y' coordinate) are stored into a new X coordinate/new Y coordinate storage section 48. The above transformation is performed using the following equation.

$$[X',Y',1] = [X,Y,1] \times \begin{bmatrix} S^X & 0 & 0 \\ 0 & S^Y & 0 \\ 0 & 0 & 1 \end{bmatrix} = [X \times S^X, Y \times S^Y, 1]$$

The new X coordinate, X', and new Y coordinate, Y', stored in the storage section 48 are supplied to the memory 41 as the coordinates after transformation.

When the transformation process is complete, the test pattern stored in the memory is supplied to the device under test (step 1114 in FIG. 11). After that, status is read out of the device under test 12 and compared with the expected value (step 1116). When the values match, the status is judged as being correct, the number of test patterns is decremented by 1, and the process returns to step 1106, to perform the next test using the next test pattern. On the other hand, when the status does not match the expected value, the status is judged as being incorrect and error processing (such as notifying the operator by displaying an error message on the CRT of the console 16) is performed (step 1120), which is followed by processing to terminate the device under test 12 (step 1112).

According to the present invention, since test patterns are generated automatically, time and labor in creating test patterns can be saved. Furthermore, since orders are selected according to the frequency of occurrence determined by using a random number value for every item, omissions of test items, as in the prior art methods, can be prevented.

Moreover, since the test program is so designed to output the test pattern after performing coordinate transformation according to the specified paper size, there is no need to prepare different test patterns for different paper sizes.

I claim:

1. A method of testing an output device which operates based on a plurality of orders, the method comprising the steps of:
   a) generating a random number;
   b) setting a frequency of occurrence for each of the plurality of orders;
   c) determining a random number range for each of the orders based on the frequency of occurrence;
   d) selecting one order from among the plurality of orders when the random number falls within a random number range corresponding to the selected order;
   e) repeating steps a) through d) a predetermined number of times to generate a test pattern containing a plurality of orders; and
   f) storing the generated test pattern.

2. A method according to claim 1, further comprising a steps of f) outputting the stored test pattern to the output device including entering an output size of the output device including and transforming coordinate data contained in the test pattern so as to match the entered size.

3. A method according to claim 2, wherein the step f) includes substeps of entering an output size of the output device and transforming coordinate data contained in the test pattern so as to match the entered size.

4. An apparatus for testing an output device which operates based on a plurality of orders, the apparatus comprising:
   generating means for generating a random number;
   occurrence means for setting a frequency of occurrence for each of the plurality of orders;
   range means for determining a random number range for each of the orders based on the frequency of occurrence;
   generating means for selecting one order from among the plurality of orders when the random number falls within a random number range corresponding to the selected order;
   test pattern generating means for generating a test pattern containing a plurality of orders by alternately enabling the random number generating means and the selecting means; and
   means for storing the test pattern.

5. An apparatus according to claim 4, further comprising output means for outputting the stored test pattern to the output device.

6. An apparatus according to claim 5, wherein the output means includes site means for entering the output size of the output device, and transformation means for transforming coordinate data contained in the test pattern so as to match the entered size.

7. A method of testing an output device which operates based on a plurality of orders, the method comprising the steps of:
   a) generating a random number;
   b) selecting one order from among the plurality of orders based on the generated random number;
   c) repeating steps a) through b) a predetermined number of times to generate a test pattern containing a plurality of orders;
   d) storing the generated test pattern; and
   e) outputting the stored test pattern to the output device including entering an output size of the output device and magnifying or reducing coordinate data contained in the test pattern in proportion to the entered size.

8. An apparatus for testing an output device which operates based on a plurality of orders, the apparatus comprising:
   generating means for generating a random number;
   generating means for selecting one order from among the plurality of orders based on the random number;
   test pattern generating means for generating a test pattern containing a plurality of orders by alternately enabling the random number generating means and the selecting means;
   means for storing the test pattern; and
   output means for outputting the stored test pattern to the output device, said output means including site means for entering the output size of the output device, and transformation means for magnifying or reducing coordinate data contained in the test pattern in proportion to the entered size.

\* \* \* \* \*

UNITED STATES PATENT AND TRADEMARK OFFICE
CERTIFICATE OF CORRECTION

PATENT NO. : 5,729,555
DATED : March 17, 1998
INVENTOR(S) : Hiroyasu ICHIKAWA

It is certified that error appears in the above-identified patent and that said Letters Patent is hereby corrected as shown below:

Col. 7, lines 61-65, amend claim 2 to read as follows:

> 2. A method according to claim 1, further comprising a steps of f) outputting the stored test pattern to the output device.

Signed and Sealed this

Second Day of February, 1999

Attest:

*Attesting Officer*

*Acting Commissioner of Patents and Trademarks*